(12) United States Patent
Bansal et al.

(10) Patent No.: US 8,086,998 B2
(45) Date of Patent: Dec. 27, 2011

(54) TRANSFORMING META OBJECT FACILITY SPECIFICATIONS INTO RELATIONAL DATA DEFINITION LANGUAGE STRUCTURES AND JAVA CLASSES

(75) Inventors: Ravi P. Bansal, Tampa, FL (US);
Robert J. Carney, Ocoee, FL (US);
Timothy J. Carroll, Tampa, FL (US);
Saravanan Kannappan, Boynton Beach, FL (US); Sara H. Waggoner, Bradenton, FL (US)

(73) Assignee: International Business Machines Corporation, Armonk, NY (US)

( * ) Notice: Subject to any disclaimer, the term of this patent is extended or adjusted under 35 U.S.C. 154(b) by 1574 days.

(21) Appl. No.: 11/413,562

(22) Filed: Apr. 27, 2006

(65) Prior Publication Data

US 2007/0255751 A1 Nov. 1, 2007

(51) Int. Cl.
*G06F 9/44* (2006.01)
(52) U.S. Cl. ......... 717/108; 707/756; 707/809; 707/810
(58) Field of Classification Search .................. None
See application file for complete search history.

(56) References Cited

U.S. PATENT DOCUMENTS

| | | | | |
|---|---|---|---|---|
| 5,596,746 A * | 1/1997 | Shen et al. | ............................ | 1/1 |
| 5,732,262 A * | 3/1998 | Gillespie et al. | ...................... | 1/1 |
| 5,787,437 A * | 7/1998 | Potterveld et al. | .................... | 1/1 |
| 6,253,366 B1 * | 6/2001 | Mutschler, III | ............... | 717/104 |
| 6,292,932 B1 * | 9/2001 | Baisley et al. | ................ | 717/114 |
| 6,343,265 B1 * | 1/2002 | Glebov et al. | .................... | 703/25 |
| 6,711,734 B1 * | 3/2004 | Baisley | .......................... | 717/104 |
| 6,874,146 B1 * | 3/2005 | Iyengar | ......................... | 719/313 |
| 6,988,273 B2 * | 1/2006 | Matula et al. | ................. | 719/316 |
| 2002/0016954 A1 * | 2/2002 | Charisius et al. | ................. | 717/2 |
| 2002/0143941 A1 * | 10/2002 | Rich et al. | ..................... | 709/225 |
| 2002/0165786 A1 * | 11/2002 | Matula et al. | ................... | 705/26 |
| 2002/0165998 A1 * | 11/2002 | Hrebejk et al. | ............... | 709/318 |
| 2003/0182461 A1 * | 9/2003 | Stelting et al. | ................ | 709/310 |
| 2003/0204504 A1 * | 10/2003 | Stuy et al. | .......................... | 707/8 |
| 2004/0093344 A1 * | 5/2004 | Berger et al. | ................. | 707/102 |
| 2005/0034107 A1 * | 2/2005 | Kendall et al. | ................ | 717/136 |
| 2005/0108684 A1 * | 5/2005 | Sohn et al. | ..................... | 717/120 |
| 2005/0203951 A1 * | 9/2005 | Schroeder et al. | ......... | 707/103 Z |
| 2006/0010161 A1 * | 1/2006 | Muenkel | .................... | 707/103 X |
| 2006/0195460 A1 * | 8/2006 | Nori et al. | ..................... | 707/100 |

OTHER PUBLICATIONS

"Data Defnition Language" Wikipedia Mar. 26, 2010. pp 1-3.*
Boldt, Juergen, "Complete MOF 1.3 Specification", Apr. 3, 2000, OMG.ORG, MOF 1.3, http://www.omg.org/docs/formal/00-04-03.
Boldt, Juergen, "Unified Modeling Language (UML) 1.3 Specification", Mar. 1, 2000, UML 1.3, http://www.omg.org/docs/formal/00-03-01.
Object Management Group MOF and UML Specifications http://www.omg.org/gettingstarted/gettingstartedindex.htm.

* cited by examiner

*Primary Examiner* — Tuan Dam
*Assistant Examiner* — Samuel Hayim
(74) *Attorney, Agent, or Firm* — Ojanen Law Offices; Karuna Ojanen

(57) ABSTRACT

A meta object facility file is parsed into a plurality of schema elements. For each schema element, it is determined that the definition of the schema element is complete. A computing artifact usable in a database description language database table or a JAVA class is created from the schema element. When the schema element is a meta object facility class, a modeling entity is created to store the computing artifacts derived from the meta object facility file wherein the modeling entity is a JAVA class. The meta object facility class is transformed into a JAVA class, and upon determining that an attribute of the meta object facility class has an array of values, an array table is created and identified in the modeling entity, and an array attribute is added to JAVABEAN information in the modeling entity.

26 Claims, 9 Drawing Sheets

TRANSFORMING META OBJECT FACILITY SPECIFICATIONS INTO RELATIONAL DATA DEFINITION LANGUAGE STRUCTURES AND JAVA CLASSES

FIELD OF THE INVENTION

This invention relates to databases and object-oriented programming, and more particularly relates to a computer-implemented method to generate manipulatable computing artifacts from a set of abstract and generic specifications described in Meta Object Facility (MOF) format.

BACKGROUND OF THE INVENTION

Meta Object Facility (MOF) metamodels define data structures for many system and computing application domains such as software modeling, data warehousing, component management, versioning, etc. MOF is a text-based specification that describes a set of objects, their attributes and their associations with other objects. MOF defines the semantics and content structure of metamodels but it does not define a concrete implementation. In order to use these MOF specifications in a business application, they need to be converted into artifacts or structures such as databases and JAVA language classes that can be instantiated, manipulated either manually or programmatically, and that can store data in memory at runtime as well as maintain data in the databases.

Prior to the invention described herein, creating useful computing artifacts such as databases and JAVA classes from a MOF format was a manual, cumbersome, multi-step process: first, the MOF format files were read and parsed using manual or automated processes; second, classes and attributes were converted into relational database data definition language statements through a series of manual and automated sub-steps. These sub-steps created a logical data model from the classes and attributes identifying entities and attributes, transformed the logical data model into a physical database design, and created the Database Description Language (DDL) from that physical database design. The third and final step created the necessary JAVA classes that were used by an application to create in-memory representations of the data in the database.

Known methods that are both manual and cumbersome include using a combination of IBM's RATIONAL ROSE and CRM Tooling products in a three-step process that loads the MOF file using CRM tooling into RATIONAL ROSE, followed by two steps within RATIONAL ROSE to transform the object-oriented model into a database design, and then generate the database data definition language statements. This solution, however, does not generate JAVA classes. Another solution is COMPUTER ASSOCIATE's ERWIN: ERWIN is a three-step process used only in the creation of the relational database but it does not support object-oriented classes and attributes and does not generate JAVA classes. In both solutions above, moreover, the results must be manually fixed and enumerated lists are not generated.

SUN MICROSYSTEMS MOF compiler is an open-source product that parses MOF files and uses the resulting object model information to generate corresponding JAVABEANS that are then stored in a binary repository. The JAVABEANS define interfaces but do not include any implementing code. The SUN MICROSYSTEMS MOF Compiler, moreover, does not translate the object model into a corresponding relational model. A WINDOWS MANAGEMENT INSTRUMENTATION MOF Compiler is a proprietary product provided with the MICROSOFT WINDOWS operating system starting with WINDOWS NT that compiles MOF files into corresponding classes and stores the classes in the WINDOWS MANAGEMENT INSTRUMENTATION repository. A PEGASUS MOF compiler is also an open-source product that compiles MOF files into corresponding classes and stores the classes in a file-based repository.

Despite the several products and their capabilities, there remains a need for an automated process of transforming a model defined using Meta Object Facility specifications into persistent data storage in a relational database and of generating object-oriented JAVA classes used to create in-memory representations of the data in the data storage. There is a further need for a simplified and automated process to streamline the systems development effort of transforming a model defined using MOF specifications into persistent data storage in a relational database and of generating object-oriented JAVA classes used to create in-memory representations of the data in the data storage. These needs and other that will become apparent are solved by the invention as stated below:

SUMMARY OF THE INVENTION

These needs and others are met by a method to transform a meta object facility file wherein a computer parses the meta object facility file into a plurality of schema elements. For each schema element, the computer determines that a definition of a schema element is complete and processes the schema element to create a computing artifact usable in a database description language database table or a JAVA class. The computer further determines that the schema element is a meta object facility class and creates a modeling entity that stores the computing artifacts derived from the meta object facility file wherein the modeling entity is a JAVA class. The computer further transforms the meta object facility class into a JAVA class, determines that an attribute of the meta object facility class has an array of values, creates an array table in the modeling entity, identifies the array table in the modeling entity and adds an array attribute to JAVABEAN information in the modeling entity.

Also described herein is a data communication system including a transmitting data processing device that transmits data on a communication network and a receiving data processing device that receives the data transmitted from the transmitting data processing device. The transmitting data processing device comprises a transmitting portion which transmits a meta object facility data file. The receiving data processing device comprises a receiving portion that receives the meta object facility data file transmitted from the transmitting data processing device. The receiving data processing device has a processor that transforms the meta object facility data file into a database description language database and JAVA classes for use on the data communication system. The processor parses the meta object facility file into a plurality of schema elements and for each schema element, the processor determines that a definition of a schema element is complete and creates a computing artifact usable in a database description language database table and/or a JAVA class. The processor determines the schema element is a meta object facility class and creates a a modeling entity that stores the computing artifacts. The processor transforms the meta object facility class into a JAVA class. The processor further determines that an attribute of the meta object facility class has an array of values and creates and identifies an array table in the modeling entity. The processor adds an array attribute to JAVABEAN information in the modeling entity.

Also described herein is a computer program product to transform meta object facility files into computing artifacts usable in a database description language database and as JAVA classes, the computer program product comprises a computer readable tangible storage device and has first program instructions to download a file in meta object facility format across a network. Second program instructions parse the meta object facility file into a plurality of meta object facility schema elements. Third program instructions create a plurality of meta object facility classes from at least one of the plurality of meta object facility schema elements that accurately reflect the object-oriented hierarchy of the meta object facility file. Fourth program instructions determine if each of the plurality of meta object facility classes has attributes. Fifth program instructions transform each of the plurality of meta object facility classes and its attributes into a database schema element wherein the database schema element is a table and has references to each attribute. Sixth program instructions create JAVABEAN information of the database schema element and its respective attributes for use in at least one JAVA class. Seventh program instructions determine that an attribute of at least one of the meta object facility classes has an array of values. Eighth program instructions create an array table in the modeling entity. Ninth program instructions identify the array table in the modeling entity. Tenth program instructions add an array attribute to JAVABEAN information in the modeling entity. The first, second, third, fourth, fifth, sixth, seventh, eighth, ninth, and tenth program instructions are stored in the computer readable tangible storage device.

Also disclosed herein is a service for managing data transfer transactions between at least one microprocessor device and a servlet, both coupled to a communication network, the microprocessor device having processing hardware and/or software. The service comprises transferring a meta object facility formatted file to the microprocessor device. The microprocessor device parses the meta object facility formatted file into at least one class having at least one attribute and creates at least one schema element pertaining to each class wherein the schema element is capable of storing the attribute and value of the attribute. The microprocessor device creates JAVABEAN information pertaining to the created database schema element. The microprocessor device determines that the schema element is a meta object facility class and creates a modeling entity that stores the computing artifacts. The microprocessor device transforms the meta object facility class into a JAVA class and determines that the attribute of the meta object facility class has an array of values. The microprocessor device creates an array table in the modeling entity and identifies the array table in the modeling entity. The microprocessor device adds an array attribute to JAVABEAN information in the modeling entity, and stores the schema element, the JAVA class, and the JAVABEAN information in a computer readable tangible storage device.

The invention is described with reference to the accompanying drawings; however, the invention may be embodied in many different forms and should not be construed as limited to the embodiments set forth herein. Rather the illustrated embodiments are provided so that this disclosure is thorough and complete, and fully conveys the scope of the invention to those skilled in the art. Like numbers refer to the like elements throughout.

DETAILED DESCRIPTION OF THE INVENTION

Figure 1:
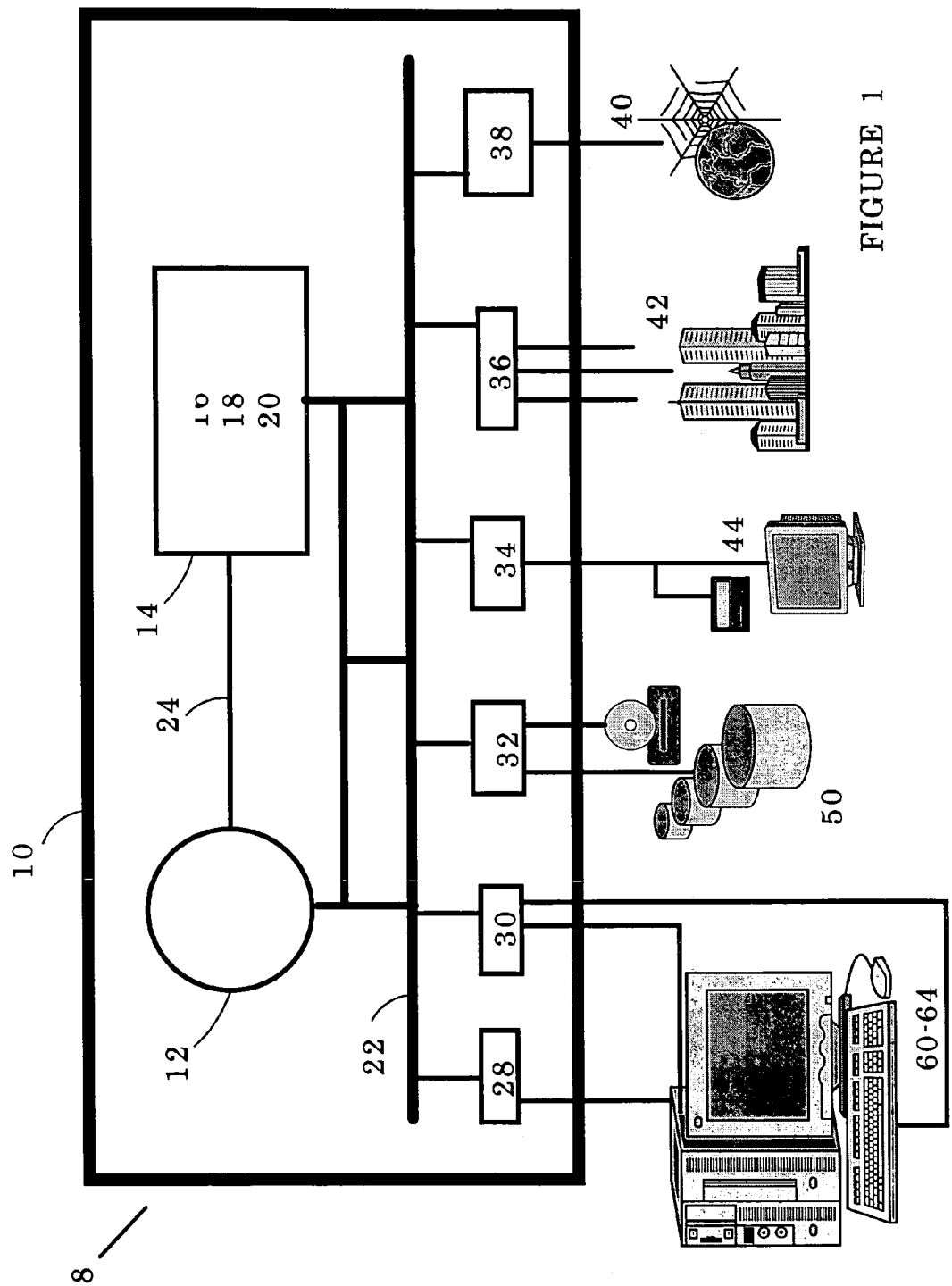
FIG. 1 is a simplified block diagram of a data processing network that can be used to render a translate MOF files in accordance with an embodiment of the invention.

Before proceeding with the detailed description of the invention, a summary of the terminology used herein is provided. An object is an abstract representation of a real-world concept or thing; for example, an object can represent a customer account in a banking application. An object may have an operation that defines an action that an object can perform, or an action that can be performed on the object or a property. For example, "make withdrawal" could be defined as an operation on a customer account object. Alternatively, an object may have a property that indicates the state of an object. Every property of an object has a value that defines the state of the object. A property can be either an attribute or a reference. An attribute defines a value that is stored within the object; for example, "current account balance" could be an attribute of the customer account object. The numeric value for the customer's account balance would be stored in the customer account object. A reference is a link or pointer to another object and implies a relationship to that other object. A reference is typically used when it is desired not to duplicate data; for example, the customer account object could store the customer's name and address as attributes. In the event that a customer has multiple accounts, the customer's name and address would appear in multiple account objects. Therefore, it is desirable to define a separate customer object and place the name and address as attributes of the customer object. The customer account object would then contain a reference to the customer object. The prefix meta as used herein shall describe a relationship. For example, metadata describes data; a metaobject is an object that represents metadata; and, metamodel an abstract language for expressing other models. The term model is generally used herein to denote a description of something in the real world.

The relational model is based on the mathematical theory of relations and was formally introduced by Dr. E. F. Codd in 1970 to describe how users perceive data. The relational model represents data in the form of two-dimension logical entities. Each logical entity represents some real-world person, place, thing, or event about which information is collected. A relational database is a database that is treated as a set of tables derived from logical entities and manipulated in accordance with the relational model of data. The relational database has a set of objects used to store, manage, and access data. The basic objects in the database are tables, columns, views, indexes, constraints (relationships), and triggers.

As will be appreciated by one of skill in the art, the present invention may be embodied as a method, data processing system, or computer program product. Accordingly, the present invention may take the form of an entirely hardware embodiment, an entirely software embodiment, or an embodiment combining software and hardware aspects, all generally referred to herein as a "module." Furthermore, the present invention may take the form of a computer program product on a computer-readable tangible storage device having computer-usable program code embodied therein. Any suitable computer-readable tangible storage device may be utilized including hard disks, CD-ROMs, optical storage devices, or magnetic storage devices.

Computer program source code for parsing, interpreting, and translating the MOF files and specifications may be written in an object oriented programming language such as JAVA, SMALLTALK or C++. The program object code may execute entirely on the software developer's computer, partly on the software developer's computer, as a stand-alone software package, partly on the software developer's computer and partly on a remote computer or entirely on the remote computer. In the latter scenario, the remote computer may be connected to the software developer's computer through a local area network (LAN) or a wide area network (WAN), or the connection may be made to an external computer via the Internet using an Internet Service Provider.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, a high-level block diagram of a computer network system 8 consistent with an embodiment of the invention is shown. Computer network system 8 may comprise any number of networked computers 10, each of which may have a central processing unit (CPU) 12, main memory 14, and various digital and/or analog interfaces 28-38. The various devices communicate with each other via an internal communications bus 22. CPU 12 is a general-purpose programmable processor, executing instructions stored in memory 14; while a single CPU is shown in FIG. 1, it should be understood that computer systems having multiple CPUs could be used. CPU 12 may be capable of executing the program instructions embodying the translation process, may be capable of generating the computer program or the instructions embodying the translation process, may be capable of receiving and transmitting the program instructions embodying the translation process, and is capable of storing the MOF file and the results generated by the translation process described herein. Communications bus 22 supports transfer of data, commands and other information between different devices, and while shown in simplified form as a single bus, it is typically structured as multiple buses including an internal bus 24 which may connect the CPU 12 directly with memory 14.

Memory 14 is a random-access semiconductor memory for storing data and programs. Memory 14 is shown conceptually as a single monolithic entity but it is well known that memory is often arranged in a hierarchy of caches and other memory devices, some or all of which may be integrated into the same semiconductor substrate as the CPU 12. Random access memory (RAM) devices comprising the main storage of computer, as well as any supplemental levels of memory, e.g., cache memories, nonvolatile or backup memories, programmable or flash memories, read-only memories, etc. In addition, memory 14 may be considered to include memory storage physically located elsewhere in computer, e.g., a cache memory in a processor or other storage capacity used as a virtual memory, e.g., as stored on a mass storage device or on another computer coupled to computer via network.

Operating system 16 and applications 18, 20 reside in memory 14. Operating system 16 provides, inter alia, functions such as device interfaces, management of memory pages, management of multiple tasks, etc. as is known in the art. Examples of such operating systems may include LINUX, AIX, UNIX, Windows-based, OS/400, an RTOS, a handheld operating system, etc. On iSERIES and AS/400 machines, OS/400 is the native operating system and object system and IFS is the UNIX object system complemented by the Qshell Unix command shell. These and other various applications, components, programs, objects, modules, etc. may also execute on one or more processors in another computer coupled to computer 10 via a network 40, 42, e.g., in a distributed or client-server computing environment, whereby the processing required to implement the functions of a computer program may be allocated to multiple computers 10 over a network 40, 42.

The invention is equally applicable to any microprocessor device 10 having an operating system 16 in which the microprocessor or processing device 10 is connected across a network 40, 42 to devices having the same or different operating systems. In general, the routines 18, 20 executed to implement the embodiments of the invention, whether implemented as part of an operating system or a specific application, component, program, object, module or sequence of instructions will be referred to herein as computer programs or simply programs. The computer programs typically comprise one or more instructions that are resident at various times in various memory and storage in a device and that, when read and executed by one or more processors in a device, cause that device to perform the steps necessary to execute steps or elements embodying the various aspects of the invention.

It should be appreciated that computer 10 typically includes suitable analog and/or digital interfaces 28-38 between CPU 12 and the attached components as is known in the art. For instance, computer 10 typically receives a number of inputs and outputs for communicating information externally. For interface with a software developer or operator, computer 10 typically includes one or more software developer input devices 60-64, e.g., a keyboard, a mouse, a trackball, a joystick, a touchpad, and/or a microphone, among others, and a display such as a CRT monitor, an LCD display panel, and/or a speaker, among others. It should be appreciated, however, that some implementations of computer 10, e.g., some server implementations, might not support direct software developer input and output. Terminal interface 34 may support the attachment of single or multiple terminals 44 and may be implemented as one or multiple electronic circuit cards or other units. Data storage 50 preferably comprises one or more rotating magnetic hard disk drive units, although other types of data storage, including a tape or optical driver, could be used. For additional storage, computer 10 may also include one or more mass storage devices 50, e.g., a floppy or other removable disk drive, a hard disk drive, a direct access storage device (DASD), an optical drive e.g., a compact disk (CD) drive, a digital video disk (DVD) drive, etc., and/or a tape drive, among others. One of skill in the art will further anticipate that the interfaces 28-38 may also be wireless.

Furthermore, computer 10 may include an interface 36, 38 with one or more networks 40, 42 to permit the communication of information with other computers 10 coupled to the network(s) 40, 42. Network interface(s) 36, 38 provides a physical and/or wireless connection for transmission of data to and from a network(s) 40, 42. Network(s) 40, 42 may be the Internet, as well as any smaller self-contained network such as an Intranet, a wide area network (WAN), a local area network (LAN), or other internal or external network using, e.g., telephone transmissions lines, satellites, fiber optics, T1 lines, wireless, public cable, etc. and any various available technologies. One of ordinary skill in the art understands that computer system 8 may be connected to more than one network 40, 42 simultaneously. Computer system and remote systems 8 may be desktop or personal computers, workstations, a minicomputer, a midrange computer, a mainframe computer. Any number of computers and other microprocessor devices, such as personal handheld computers, personal digital assistants, wireless telephones, etc., which may not necessarily have full information handling capacity as the large mainframe servers, may also be networked through network(s) 40, 42. Still yet, any of the components of the method and program products shown in the embodiments of FIG. 1 through FIG. 9 could be deployed, managed, serviced by a service provider who offers to receive MOF specifications over a computer network and then provide concrete and usable computing artifacts of the MOF formatted file in a usable DDL specified schema and/or usable JAVA classes.

Figure 2:
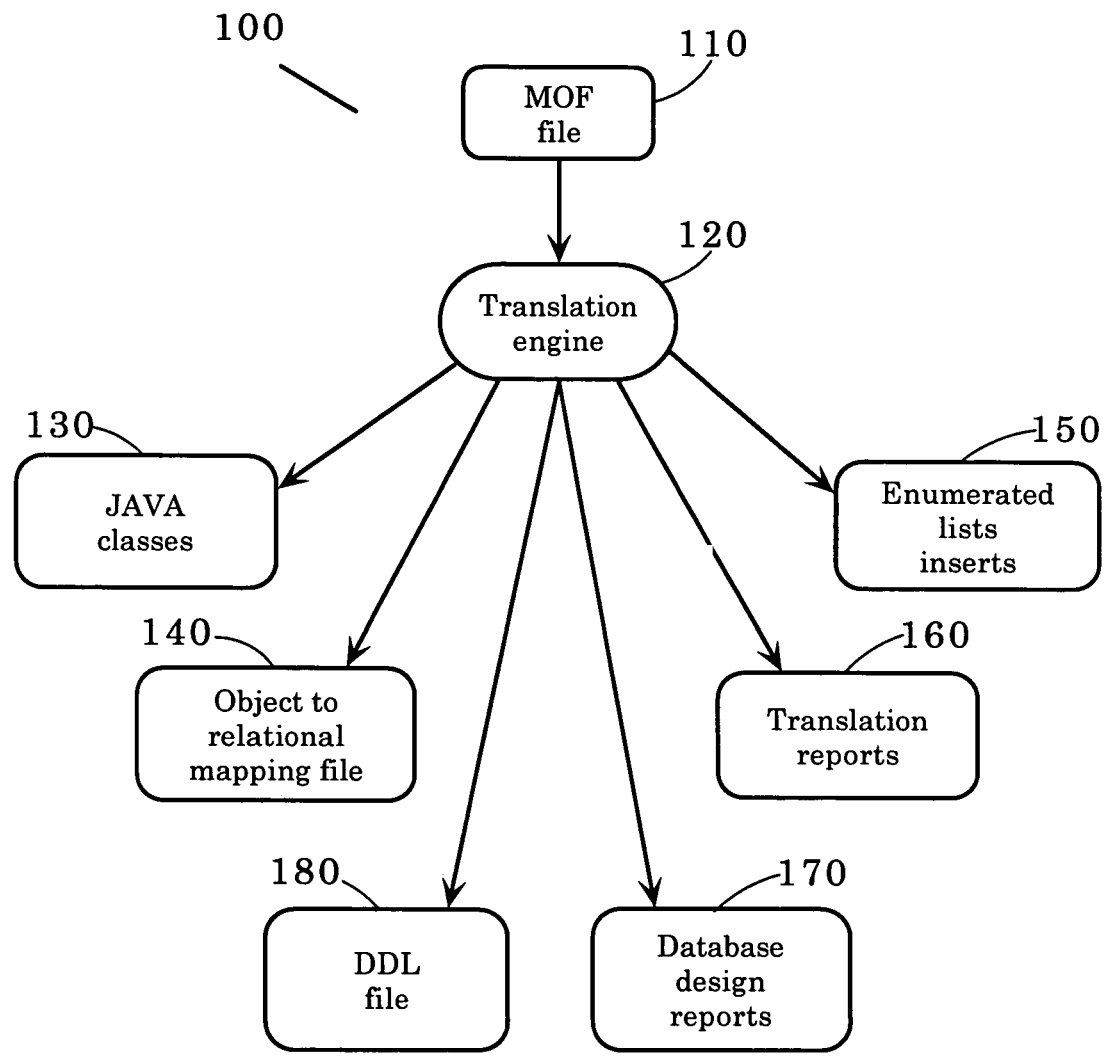
FIG. 2 is a simplified block diagram of the input and the outputs generated by a MOF translation engine and its processes as described herein.

With respect to FIG. 2 now, among the applications or routines that can be loaded onto the computing device is a translation engine 120 capable of translating a Meta Object Facility (MOF) specification or file 110 into useful computing artifacts and/or Java classes usable by a database description language (DDL) computer application. In fact, any computer data that is presented in a MOF format can be reformatted using the method described herein to be used in other object-oriented applications or and/or DDL applications, including but not limited to descriptions of an entire industry, or billing system, etc. FIG. 2 provides a broad overview 100 of the major inputs, processes, and outputs of the translation engine in accordance with an embodiment of the invention. The MOF file 110 is an industry standard specifications file for defining objects; one or more MOF files are input to the translation engine 120. The translation engine 120 first parses the MOF file and generates the database data definitions file 180, the JAVA classes 130, and the XML object-to-relational (O/R) mapping file 140 and more.

The DDL files 180 created by the translation engine 120 and its processes accurately reflect the object-oriented hierarchy of the objects described in a MOF file. The MOF classes are transformed to database tables, the class attributes are transformed to columns within the table and prefix names may be used to create schema names. The translation engine preferably uses the schema name "enum" for all MOF enumerated lists tables generated. When creating table names and column names, the translation engine may remove all MOF prefixes from class names, e.g., CIM_, and remove all attribute names whether prefix, embedded or suffix when creating table names and column names. When no parent class exists, the translation engine and process described herein creates a unique generated primary key column for classes. If, however, a parent class does exist, the translation engine and process herein use the parent's primary key as the key of the class and creates a database constraint linking the child to the parent, e.g., Class classname: parent class name. The translator/process further creates database comment statements tables and columns using the description of the classes and the attributes and then transforms MOF attribute data types to database column data types.

By way of example only, IBM DB2 data types use the following translations to create the correct data type:

| | |
|---|---|
| string | Varrchar (*see below*) |
| uint8 | Smallint |
| uint16 | Integer |
| uint32 | Decimal(19.0) |
| uint64 | Decimal(19.0) |
| datetime | Timestamp |
| real32 | Real |
| real64 | Real |
| sint8 | Smallint |
| sint16 | Integer |
| sint32 | Decimal(19.0) |
| sint64 | Decimal(19.0) |

*For string to varchar translations use the keyword MaxLen(nn) to set the varchar length. If MaxLen is not specified default to varchar(254). If an attribute is also identified as either a primary key or secondary unique index, override the MaxLen value with the default if it is greater than the default. DB2 does not allow indexes to be created with column lengths greater that 254.

The translation engine also creates a single unique index using all attributes and/or columns identified with the keyword "Key". The format for the name of the unique index may be: tablename_akn where "n" is an incremental number for additional unique indexes, for example: "employee_ak1". For association classes the translation engine creates a table linking it to the parent classes/tables. Preferably, the "Ref" keyword role name and suffix "ID" are used as the column name. The translation engine further creates database constraint statements using the column names of the parent object class/database table using the column names of the parent's primary key column name. It uses the parent column data type for new column's data type. For example:

```
class CIM_Dependency {
    [Key, Description (
        "Antecedent represents the independent object in this "
        "association.")]
    CIM_ManagedElement REF Antecedent;
    [Key, Description (
        "Dependent represents the object dependent on the "
        "Antecedent.")]
    CIM_ManagedElement REF Dependent;
``` creates the following:
  Table name: Dependency
  Primary key: DependencyID (see 4 above for explanation)
  Columns: AntecedentID and DependentID
  Unique secondary index Dependency_AK1 on columns
  Constraints on both columns to parent table ManagedElement and
  column ManagedElementID.

Attributes with arrays can be identified either by the keyword "ArrayType" or by the trailing [ ] after the attribute name. The translation engine and process creates a child table moving the attribute to the child table, cascading the parent table primary key and adds a column, a SequenceNumber Integer, to the primary key. The table name is a combination of the parent table name and the array attribute name. The translation engine and the process described herein further creates a foreign key constraint from the new table back to the parent table.

Attributes with enumerated lists can be identified either by the keywords "ValueMap" and "Values"; both must be present. The translation engine creates a second enumerated list table using the enumerated list attribute as the primary key of the new table and a new "attribute name Description" column (varchar254). The new table name is a combination of "El" and the attribute name. It leaves the attribute on the existing table and creates a foreign key constraint from the parent table to the new table.

For attributes with arrays and enumerated lists, the translation engine creates a combination of both of the above where the child array table is an intersection table between the original table and the enumerated list table. Both parent tables' primary keys are cascaded into the intersection table. The name is a concatenation of the original table and the enumerated list table (minus the El prefix). It creates a constraint from the intersection table to each of the parent tables.

The translation engine further creates output files listing the old unabbreviated object name and the newly created abbreviated relational name. These are comma delimited files and include a list of tables, and a list of columns. The table names are unique within the generated DDL file generated, and the column names are unique with the table. The translation engine creates same name columns, i.e., foreign key columns on parent and child tables. The translation engine creates constraint names that support the convention of parent-tablename_cnn where "nn" is an incremental number within the table, e.g. "employee_c01". The translation engine further creates index names that support the following conventions:
  tablename_pk for primary key statement, e.g., "employee_pk";
  tablename_akn where "n" is an incremental number for additional unique indices, e.g., "employee_ak1"; and
  tablename_ien where "n" is an incremental number for additional non-unique secondary indices, e.g., "employee_ie1".

The JAVA classes 130 created by the translation engine 120 may be used by an application to create in-memory representations of the data in the database. The JAVA classes represent each MOF class and correspond to the objects defined in MOF format. The translation engine 120 and its process as described herein further creates JAVA class attributes that represent each MOF attribute and accessor methods for these Java class attributes.

The translation engine 120 and its method described herein further generates object-to-relational mapping files 140 that correlate the JAVA classes and their attributes to the tables and columns in the created database. The translation engine may also create an object-to-relational mapping file, such as in XML, that maps the JAVA object model to a relational database model. Each Java object is represented by a <class> element composed of attributes, a <map-to> element and <field> elements. The <map-to> element contains a reference to the relational table to which the Java object maps. Each <field> element represents a class variable and is composed of attributes and one <sql> element. The <sql> element represents the column in the relational table to which the <field> element maps. This O/R mapping file can be used to configure third-party object-to-relational persistence engine s, such as CASTOR and HIBERNATE.

The translation engine 120 also generates enumerated list insert statements 150 used to load the data gathered from the MOF definitions for any enumerated list attributes. The MOF definitions contain explicit value sets, i.e., enumerated lists, that the translation engine 120 uses to build structured query language (SQL) insert statements for loading the enumerated list values into the database. These insert statements are written to a script file which is executed to insert the values into the corresponding tables. Additionally, import and export load statements along with the grant authorization SQL statements are created.

Object-to-relational name translation reference reports 160 comprise listings of each class name and its translated table name. Each class attribute name is also associated with its corresponding translated table column names. Translation reference reports 160 further comprise a file having lists of values assigned to specific class attributes for reference by users.

The database design reports 170 are also generated by the translation engine 120 and its method described herein; these reports 170 are used by development and testing to understand the database design and may include a data dictionary report containing the class/entity name, table name, attribute name, and column name; table and column report including datatype, size, whether nullable or not, and default values listing. The database design reports 170 may further include a referential integrity constraint report that maps to the associations defined in the MOF file.

The DDL File 180 comprises the create table, create index, create constraints, import and exports statements, and SQL grant authorizations statements.

Figure 3:
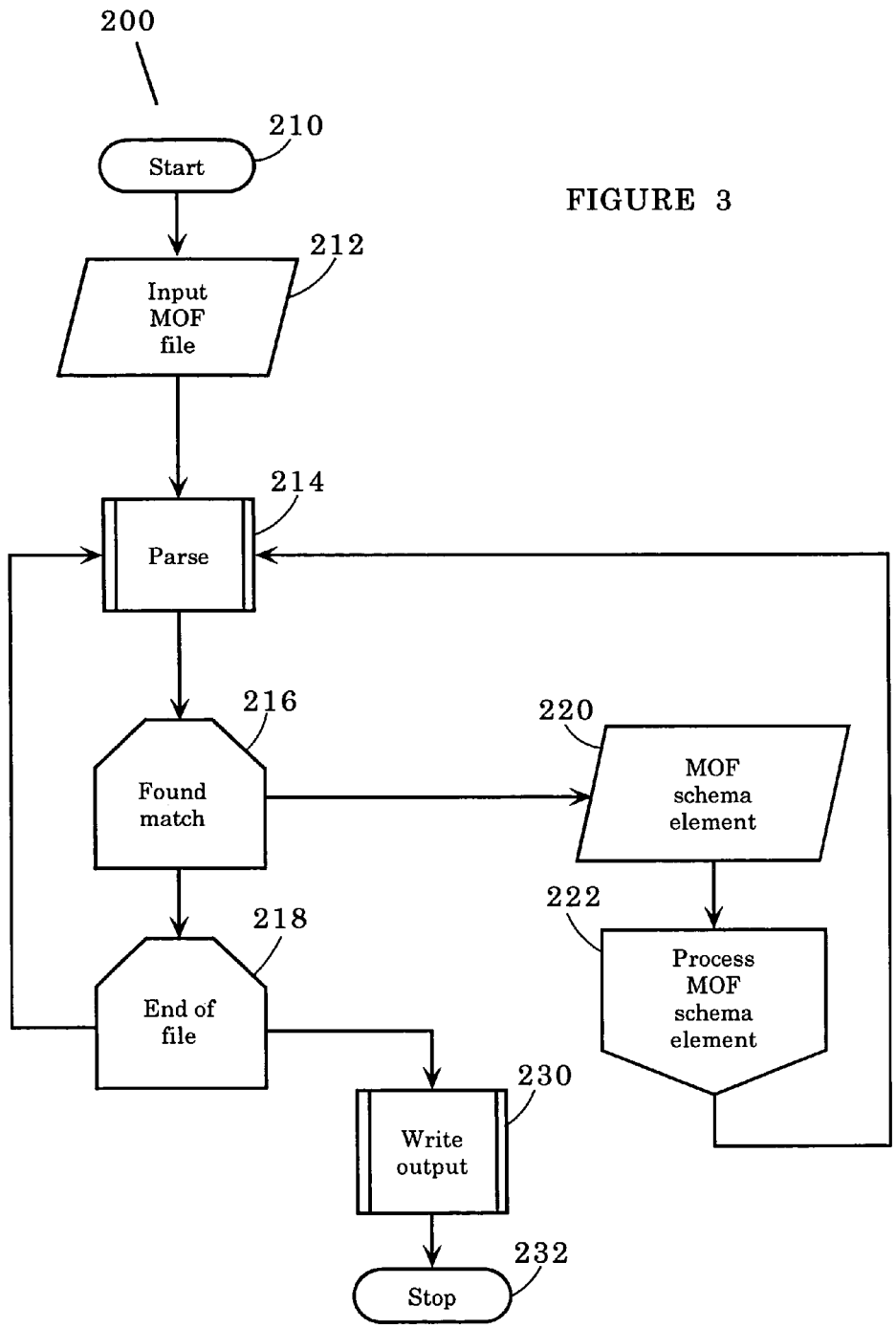
FIG. 3 is a simplified flow chart of parsing a MOF input file and determination of schema elements in accordance with an embodiment of the invention.

FIG. 3 is a simplified flow chart of the initial steps of the MOF translation process 200. The process 200 starts at step 210, then the translation engine reads the MOF classes to be translated from one or more input files at step 212. Different sections of the class hierarchy may be defined in different files that are linked by "pragma include" statements. Within each file, classes are preferably defined starting with the highest class in the hierarchy and continuing downward. Class definitions preferably only refer to classes and qualifiers that have already been defined. In step 214, the translation engine parses the MOF input file to discern the MOF schema element definitions. The parsing process 214 reads the input file and generates tokens representative of objects that are class definitions and class attribute definitions. A schema element may be considered as a subset of the object's total properties. Other properties, such as object methods, could also be generated in this step. Each definition includes a class or attribute declaration plus any qualifiers preceding the declaration. Parsing in step 214 further checks the token stream for valid parsing expressions and aggregates the expressions until they form a complete element definition. In step 216, if the translation engine determines that it has read a complete element definition from the file, it exits the parsing process long enough to create representations of the corresponding JAVA-BEAN and database definition at step 222. At step 218, the translation engine stops parsing when it reaches the end of the file and, at step 230 after exiting the parsing loop, the translation engine writes the completed JAVABEANS, database definition statements, and reference information to output files.

Figure 4:
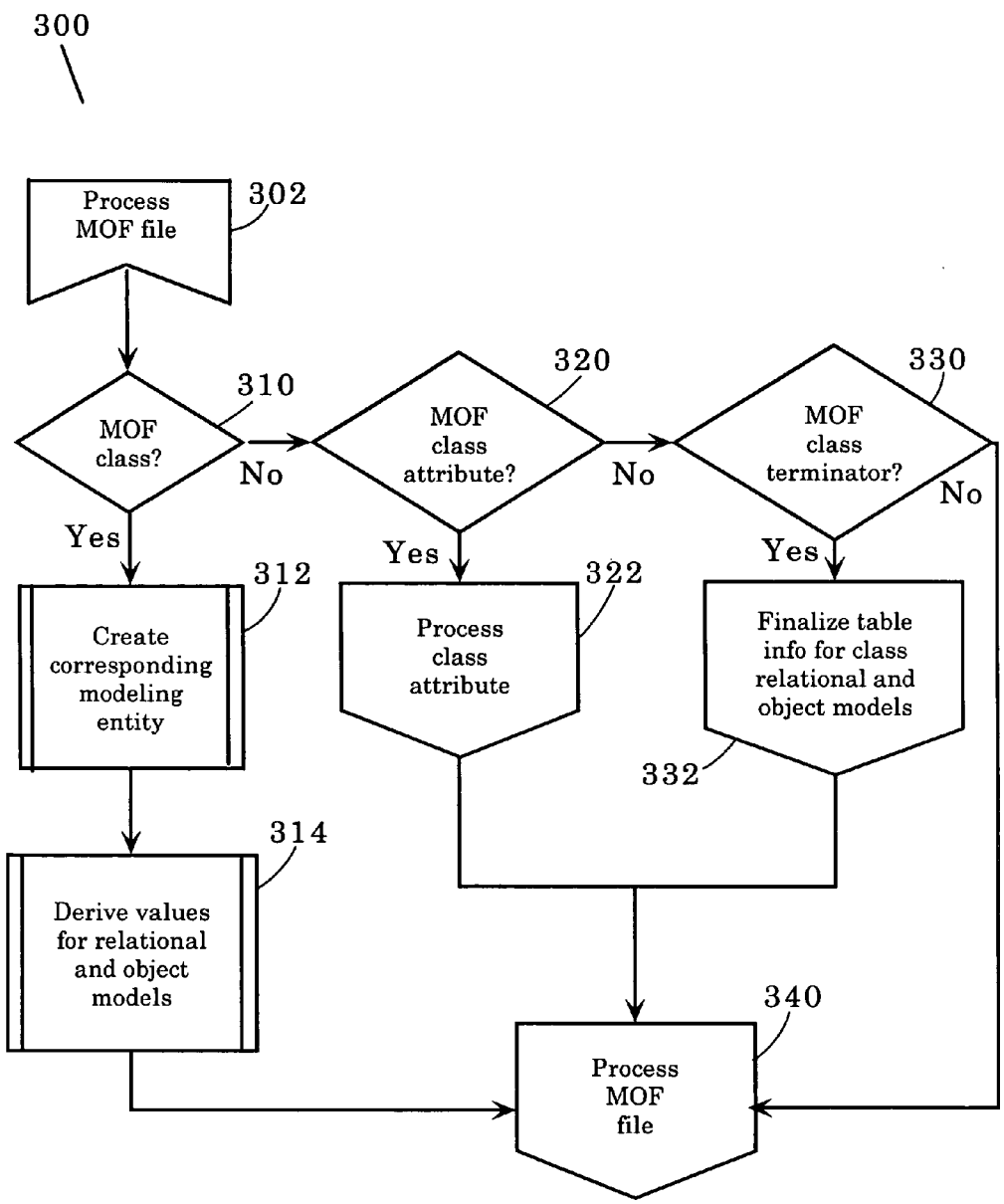
FIG. 4 is a simplified flow chart of a process by which the translation engine and its process determines the nature of a MOF schema element in accordance with an embodiment of the invention. It is suggested that FIG. 4 be printed on the face of the patent.

FIG. 4 presents a simplified flow chart of the process steps 300 that processes a MOF schema element, such as in block 222. In step 302, the translation engine begins processing the MOF schema element by first checking to see if it defines a MOF class, as in step 310. The parsing process of step 214 in FIG. 3 separates the definitions of class attributes from the definition of the class itself so processing of class attributes is not included in the processing of the class definition here. In step 312, to process a MOF class definition, the translation engine creates a corresponding modeling entity, e.g., a JAVA object, that represents a multi-purpose modeling entity that will store information derived from the MOF class definition. While shown in this particular implementation as a JAVA object, one of skill in the art will realize that other objects in other object-oriented programming languages could also be created. The modeling entity created includes components for representing the class as a JAVABEAN and as one or more tables within a data model. In step 314, the translation engine analyzes the MOF class definition to derive information needed to represent the modeling entity in a relational model and an object model. The information generated using the MOF class definition includes the names of the corresponding database table, the corresponding JAVABEAN, its parent class if there is any, the database schema and any table that supplies primary key values, i.e., the enumerated lists, for this entity's table. In step 314, a table definition is initialized and a container for collecting information about the table, such as column names and types, is created within the entity-modeling object for the MOF class.

To comply with restrictions on the length of database table names, the translation engine uses a configurable utility to abbreviate table names as needed. An example of an abbreviation routine and rules that could be used by a translation engine is given herein. After each rule, the translation engine checks for table and column name length database limitations. By way of example only: all class prefixes may be removed; all extraneous words may be removed, e.g., "the" "and" "or"; all vowels may be removed except if a vowel begins a word or if there is a double vowel, then one of the vowels is removed, e.g., book to bok; double characters may be removed, e.g. support to suport; additional trailing abbreviation words may be removed; and extraneous special characters within the name to prevent database syntax errors are removed.

If the translation engine determines that a MOF schema element is not a class definition in step 310, then in step 320, the translation engine checks to see if the schema element is a class attribute definition. If so, then at step 322, the translator's MOF parsing process at step 214 preferably returns class attribute definitions immediately after returning the definition of the owning class. Because of the nature of the standard structure of a MOF filed which identifies all the attributes of a class immediately after identifying the class itself, each class attribute encountered by the translation engine is processed as an attribute of the last class encountered.

If the translation engine determines that a MOF schema element is not a class definition in step 310, nor a class attribute definition in step 320, the process then checks in step 330 if the schema element is a class definition terminator. If so, then in step 332, the translation engine finalizes the relational and object model information for the class and its attributes as described further in FIG. 9.

Figure 5:
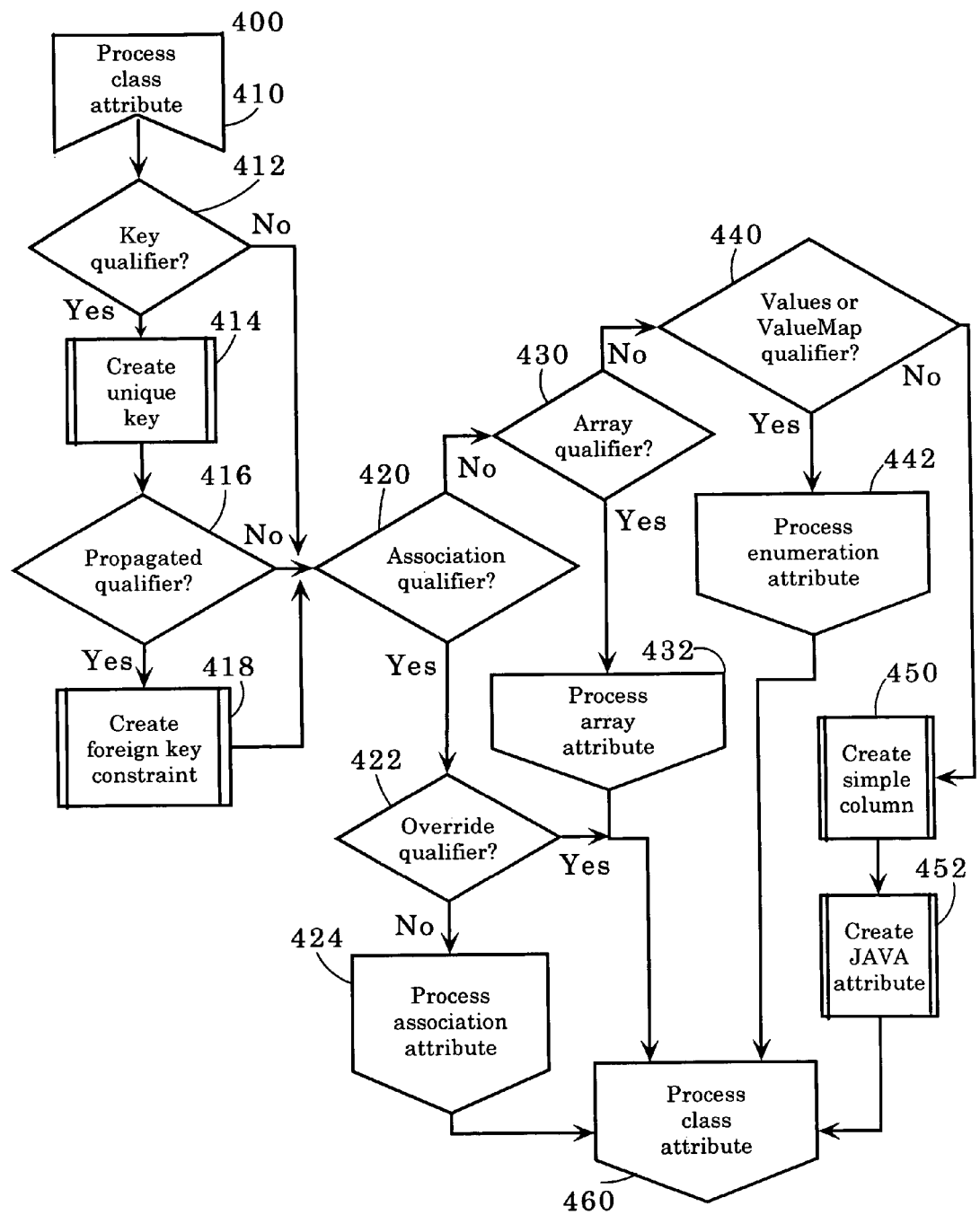
FIG. 5 is a simplified flow chart of a process by which the translation engine and its process determines the nature of an element in accordance with an embodiment of the invention.

The schema element of the MOF file may have attributes which are determined and processed at 400 of FIG. 5. At step 410, the translation engine determines if the schema element has a key qualifier attribute. The key qualifier indicates that the attribute's value is part of the object name that uniquely identifies each instance of the class. If the class has a key qualifier attribute, then in step 414, a unique key is created and the translation engine adds the unique key to a list of unique key columns for the corresponding table within the class's modeling entity. When DDL is generated for this MOF class, the translation engine uses this list to define a unique key constraint for the table. Then at step 416, the translation engine inquires if the key has a propagated qualifier. A propagated qualifier identifies an attribute of a class that has already been defined and indicates that the current class attribute will have the same value as the attribute identified by the qualifier. If the key has a propagated qualifier at step 416, then at step 418, the translation engine creates a foreign key (FK) constraint on the propagation source. When a class attribute has the propagated qualifier, the translation engine adds the propagated qualifier constraint to a list of foreign key columns for the corresponding table within the class's modeling entity. When DDL is generated for this MOF class, the translation engine uses the list to define foreign key constraints for the table.

If, in step 412, the schema element being processed does not have a key qualifier or, if in step 416, the element does not have a propagated qualifier, the translation engine then inquires at step 420, if the element has an association qualifier. Classes that contain association qualifiers associate two or more previously-defined classes and each association qualifier identifies a previously-defined class. If there is an association qualifier, then step 422 determines if the association qualifier is an "override" indicating that the attribute overrides the corresponding attribute of the parent class. When an attribute has an association qualifier and an override qualifier, the implication is that the parent of the current MOF class contains a duplicating attribute, so in this case, the translation engine does not add the attribute to the model entity for the current MOF class. The schema element is processed as in step 460. If, however, in step 422, the association qualifier does not have an override qualifier, then in step 424, the association attribute is processed in accordance with FIG. 8.

If the attribute does not have an association qualifier in step 420, then the translation engine inquires if the attribute has an array qualifier in step 430. The presence of square brackets [ ] after an attribute's datatype indicates that the attribute contains an array of values rather than a single value. If there is an array, then in step 432, the array attribute is processed.

If the attribute has neither an association qualifier in step 420 nor an array qualifier in step 430, then the translation engine inquires if the MOF class attribute has Values or a ValueMap qualifier. If the MOF class attribute has a Values or ValueMap qualifier in addition to an array qualifier, the values in the array are enumerated, as in step 442. Details of processing the Values or ValueMap qualifier are given in FIG. 7.

In step 460, the translation engine has determined that MOF class attribute does not associate another class at step 420, does not contain an array of values at step 430, does not reference an enumerations at step 440, so the translation engine adds a corresponding column to the table definition within the class's modeling entity at step 450. The translation engine determines the correct datatype for the column using a configurable lookup table that maps MOF attribute types to datatypes for the database being used. At step 452, in addition to defining the table columns and/or new tables needed to represent the attribute in the data model, the translation engine adds a corresponding attribute to the JAVABEAN information stored in the current class's modeling entity.

Figure 6:
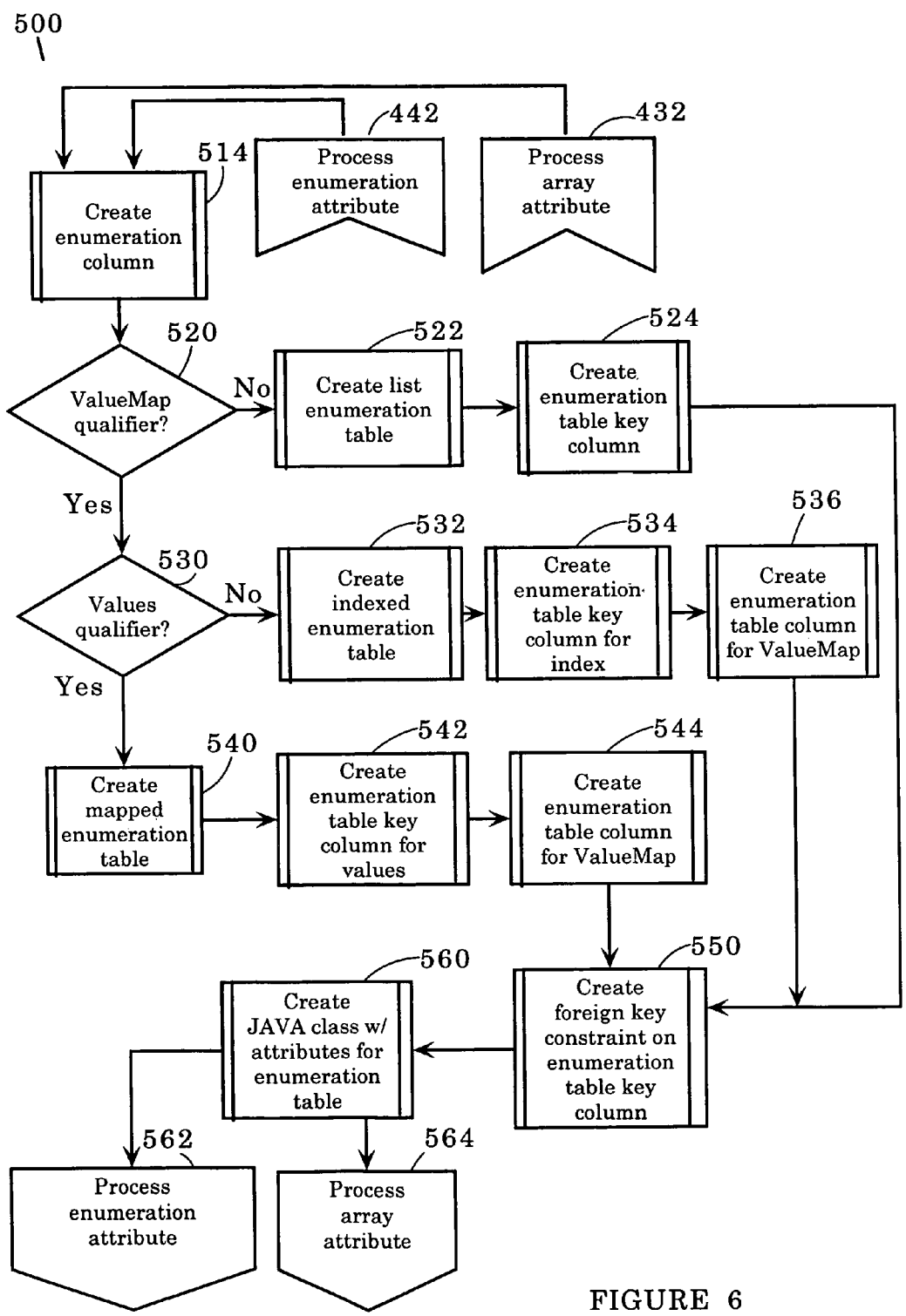
FIG. 6 is a simplified flow chart of a process by which the translation engine and its process determines the nature of an enumeration attribute in accordance with an embodiment of the invention.

How the translation engine processes enumeration attributes in step 442 is presented as the enumeration process 500 of FIG. 6. An enumeration column is created in step 514 given that attributes 510 and array attributes 512 exist. The translation engine treats attributes that have Values or ValueMap qualifiers as references to enumerations. To represent the attribute in the data model, the translation engine adds a column for the attribute to the MOF class's corresponding table in the modeling entity and then creates a separate table to represent the enumeration that the attribute references. The translation engine can be configured to use a separate schema for tables that represent enumerations. In step 520, if the attribute does not have a ValueMap qualifier, the translation engine defines a separate list enumeration table and represents the attribute as a simple list of values and creates an enumeration table in step 522. The table will contain a column for the list values. In step 524, for the list enumeration table created in step 522, the translation engine places the values identified in the primary key column.

If in step 520, the attribute has a ValueMap qualifier, then in step 530, the translation engine determines if the attribute has a Values qualifier. An attribute that has a Values qualifier represents an indexed list of values, but if the attribute does not also have a ValueMap qualifier, the index of each list entry is equal to the position of the entry in the list, where the position of the first entry is zero. In step 532, to represent an enumeration where the entries are indexed based on list position, the translation engine defines a separate indexed enumeration table. This table will include columns for an index and a value column. In step 534, for indexed enumeration tables, the translation engine defines a primary key column to hold the index. The index value will be generated when the data load file for the enumeration tables is written at the conclusion of the translation process. Then at step 536, the translation engine places the values identified by the ValueMap qualifier in the non-key column for indexed enumeration tables.

Step 540 of FIG. 6 represents the case where the attribute has a ValueMap qualifier in step 520 and has a Values qualifier in step 530. An attribute that has a Values qualifier represents an indexed list of values. If the attribute also has a ValueMap qualifier, the index of each list entry is equal to the position of its value within the ValueMap, where the position of the first entry in the ValueMap is zero. To represent an enumeration where the entries are not indexed based on position, in step 540, the translation engine defines a separate mapped enumeration table that includes columns for an index and a value column. In step 542, for mapped enumeration tables, the translation engine places the values from the ValueMap qualifier in the key column; and in step 544, the translation engine places the values from the Values qualifier in the non-key column.

After the appropriate enumeration table has been created and populated, the translator, at step 550, creates a foreign key (FK) constraint on enumeration table key column. To link the separate enumeration table to the referencing attribute defined for the current MOF class's main table, the translation engine adds the primary key column for the separate enumeration table to the list of foreign key columns for the main table. When DDL is generated for this MOF class, the translation engine will use the list to write foreign key constraints for the table. Then at step 560, the translation engine creates a JAVA class having attributes for the enumeration table. In addition to defining the new table for the enumeration attributes, the translation engine also in step 560 adds a corresponding attribute to the JAVABEAN information stored in the current class's modeling entity. Thus, the enumeration attributes 562 and the array attributes 564 have been processed in accordance with the embodiment described herein.

Figure 7:
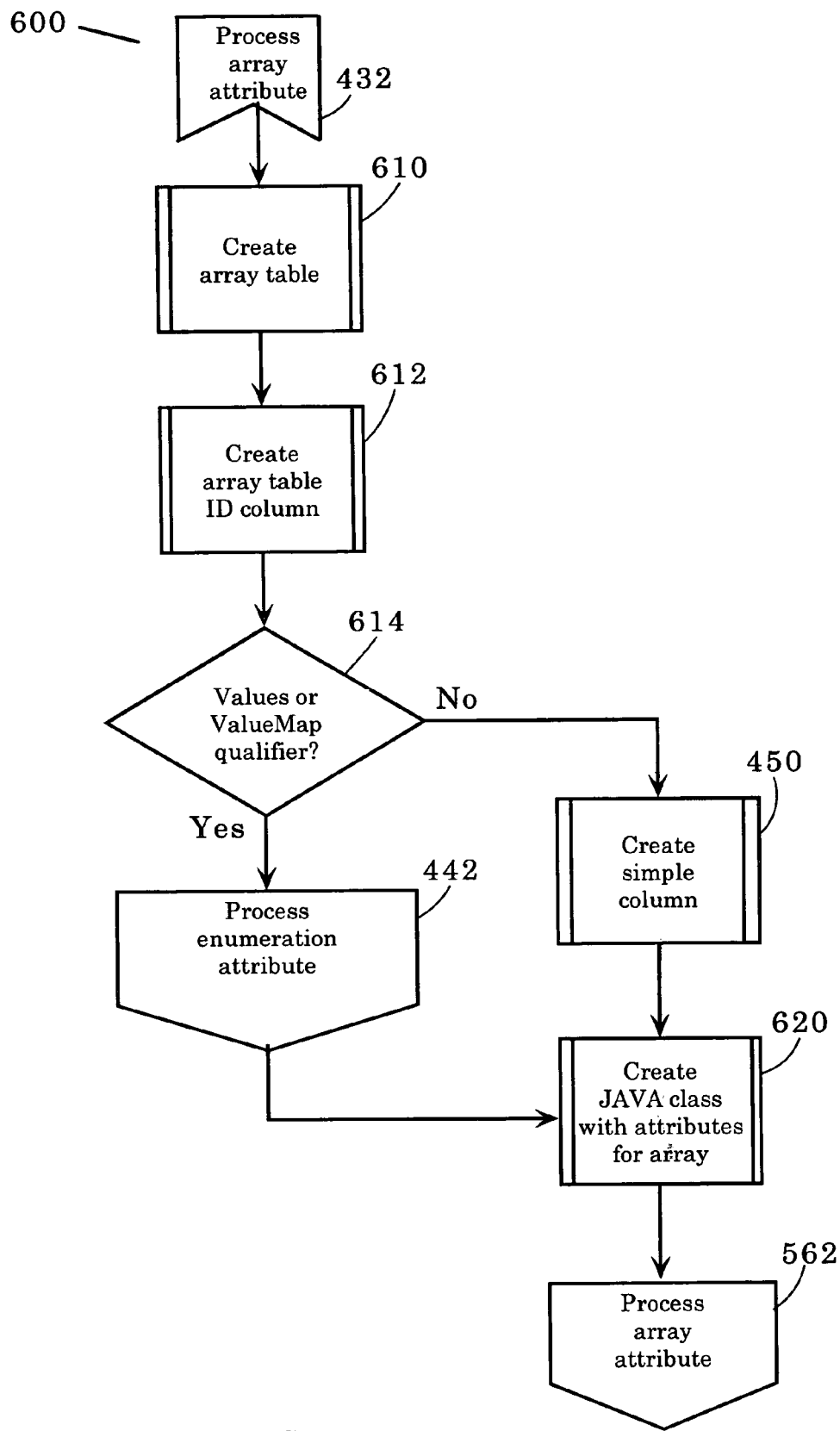
FIG. 7 is a simplified flow chart of a process by which the translation engine and its process determines the nature of an array attribute in accordance with an embodiment of the invention.

FIG. 7 describes the process 600 by which the translation engine processes array attributes. In step 610, when a class attribute contains an array of values, the translation engine represents the array within the data model using a separate table created in step 610. This array table will include the primary key for the current class's main table. The translation engine stores information about the new table in a list of array tables for the current class's modeling entity. In step 612, to represent each array element's index, the translation engine defines an "ID" column for the array table. The index stored in the ID column will be generated automatically when a record is added to the array table. In step 614, if the MOF class attribute has a Values or ValueMap qualifier in addition to the Array qualifier, the values in the array will come from an enumeration and the process continues in step 442.

If, however, the attribute does not have a Values or ValueMap qualifier in step 614, each array element will contain a value of the type identified in the MOF for the class attribute. In this case, the translation engine simply adds a corresponding column to the array table in step 450. The translation engine determines the correct datatype for the column using a configurable lookup table that is a compilation of industry standard and specific mappings that maps MOF attribute types to datatypes for the database being used.

At step 620 which follows from processing the enumeration attribute in step 442, and also follows from defining a new table for the array attribute in step 450, the translation engine adds a corresponding attribute to the JAVABEAN information stored in the current class's modeling entity.

Figure 8:
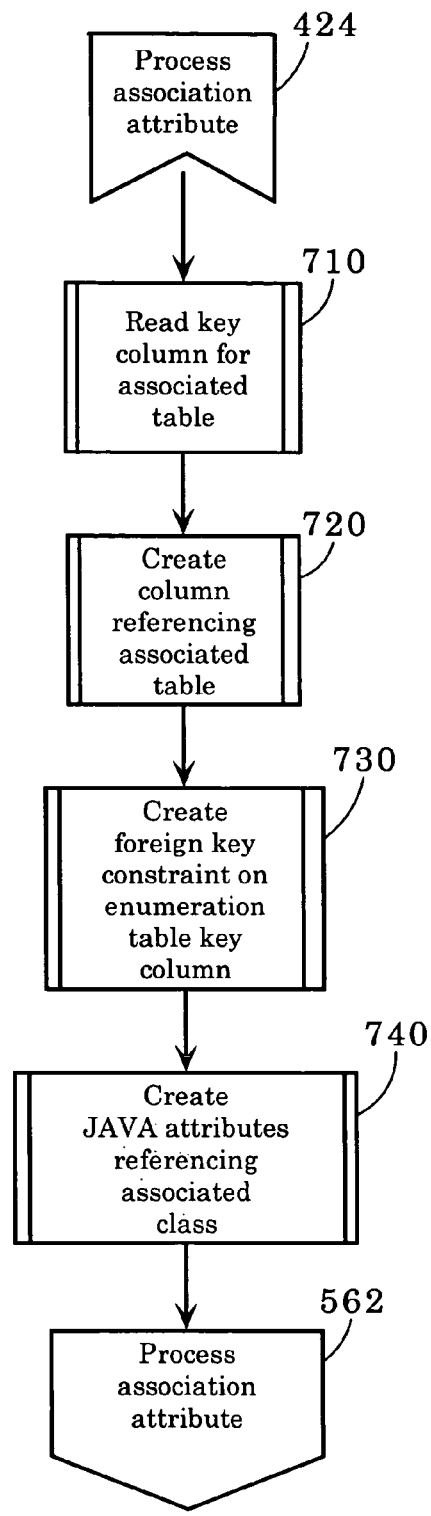
FIG. 8 is a simplified flow chart of a process by which the translation engine and its process determines the nature of an association attribute in accordance with an embodiment of the invention.

FIG. 8 illustrates the process 700 whereby the translation engine processes an association attribute. When the current class associates other classes, the translator, in step 710, reads the primary key columns for each associated class. In step 720, the translation engine creates a column referencing the associated table whereby the translation engine adds the primary key columns for each associated class to the list of primary key columns in the appropriate table of the current class's modeling entity. The translation engine then creates the foreign key constraint on the enumeration table key column at step 730. The translation engine also adds the primary key columns for each associated class to the list of foreign key columns for the corresponding table within the current class's modeling entity. When DDL is generated for this MOF class, the translation engine uses the list to write foreign key constraints for the table. In step 740, the translation engine creates JAVA attributes that reference the associated class. In addition to defining a new table for the array attribute, the translation engine adds a corresponding attribute of the associated class to the JAVABEAN information stored in the current class's modeling entity.

Figure 9:
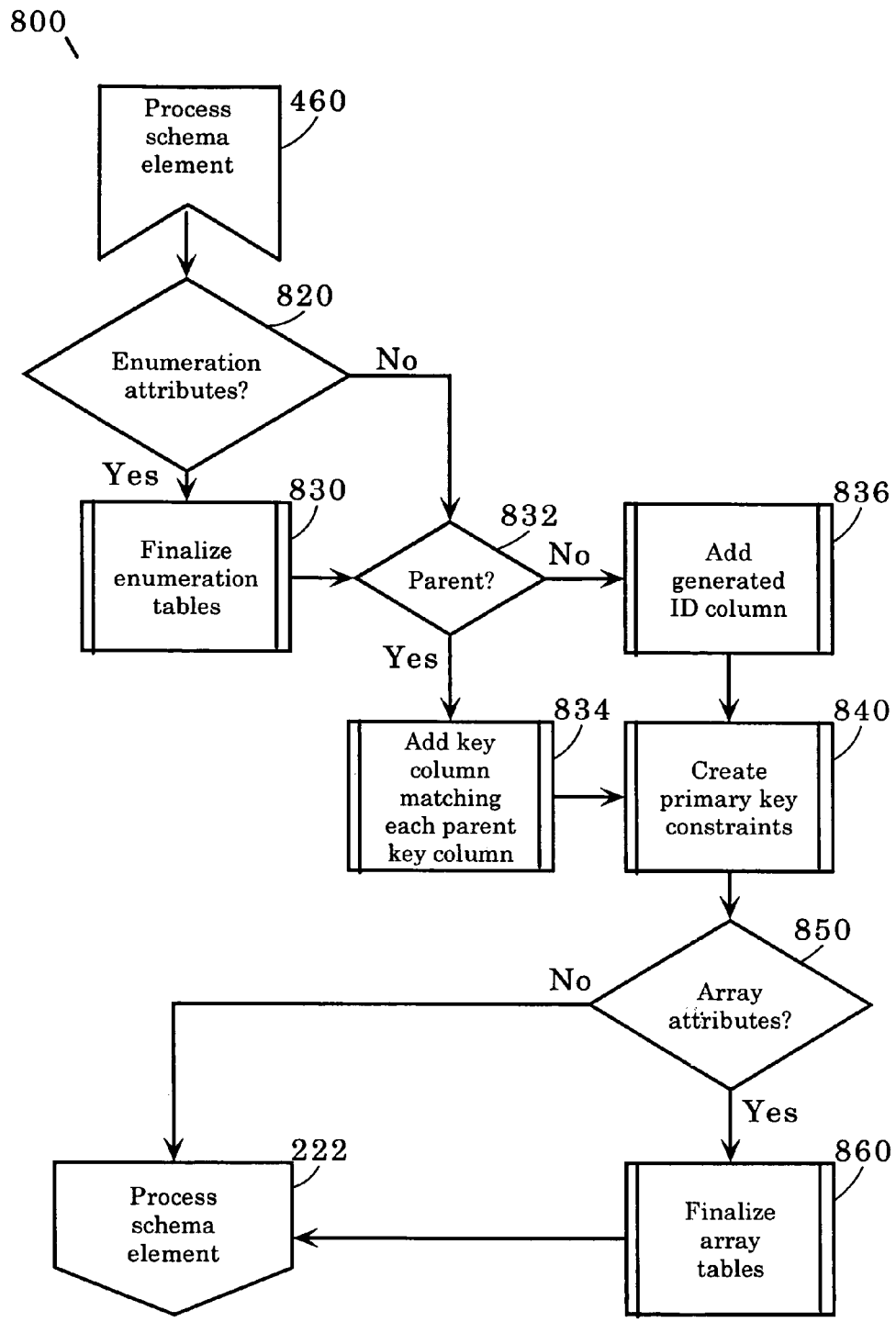
FIG. 9 is a simplified flow chart of a process by which the translation engine finalizes the translation of a MOF schema element in accordance with an embodiment of the invention.

FIG. 9 represents the process 800 by which the translation engine processes MOF schema elements that reference an enumeration. If the schema element has enumeration attributes, the definition of the separate enumeration table is stored in the class's modeling entity. Then when the translation engine finalizes the tables, it checks for enumeration attributes at step 820. At step 830, the translation engine finalizes the enumeration tables and defines a dummy non-key column for tables that only contain a key column. The dummy column is preferred to use the translator's output with an object-to-relational persistence service, such as CASTOR.

If at step 820, the schema element does not have enumeration attributes, then the translation engine determines if the schema element has a parent class in step 832. With the exception of enumeration tables, the translation engine defines each table's primary key, including adding the primary key columns to the class's modeling entity, when finalizing the table. The primary key includes at least one ID column and may also include other key columns. The translation engine determines what columns to add for the primary key depending on whether the table is for a MOF class that inherits from another MOF class. When the table the translation engine is finalizing is for a MOF class that has a parent class, it inherits its primary key columns from the table defined for the parent class. So, at step 832, the translation engine determines if the schema element has a parent class. For tables that inherit their primary key columns, from a parent class, in step 834, the translation engine reads the ID column and any other primary key columns from the parent table and defines a matching column for each within the child table.

For tables that do not inherit their primary key columns, the translation engine defines a generated ID column for each the child table at step 836. In either case, the translation engine creates a primary key (PK) constraint at step 840 and adds each of the new columns to a primary key column list. The primary key constraint is used to write the DDL for the table's primary key constraint. When the translation engine processes an array attribute for a MOF class, it stores information about the attribute and the corresponding array table in the class's modeling entity. So that another step of finalizing the tables defined for a MOF class, step 850, the translation engine checks for array attributes. If so then at step 860 the translation engine reads the information stored in the modeling entity for each and repeats the steps described above for the corresponding array table.

The benefits of this invention include: (1) a simplified single step process whereas all other known solutions are multiple step processes; (2) a single source MOF input that does not require separate object and/or data models; (3) the output is DDL that is ready for production, no modifications are required; (4) JAVA classes are generated; (5) the inheritence-based database design supports object inheritance in the MOF specification; and (6) direct control is allowed over translation between object and relational models. It will be appreciated that variations of some elements are possible to adapt the invention for specific conditions or functions. The concepts of the present invention can be further extended to a variety of other applications that are clearly within the scope of this invention. Having thus described the present invention with respect to preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

APPENDIX

Below is an Example of a Mof Specification that is Used as an Input to the process. The MOF specification describes the structure of a class and its attributes. There are other element types the describe the type of class such as whether it is a parent class or a sub-class.

```
//=========================================================
// IBM ManagedElementType
//=========================================================
    [Version ( "2.7.0" ), Description (
        "This is the IBM extention and stores "
        "information about ManagedElementType. ")]
class IBM_ManagedElementType {
    [Description (
        "The ManagedElement Type Acronym."),
        MaxLen ( 10 )]
    string ManagedElementTypeAcronym;
    [Key, Description (
        "The ManagedElement Type Caption."),
        MaxLen ( 64 )]
    string ManagedElementTypeCaption;
    [Description (
        "The ManagedElement Type Description."),
        MaxLen ( 1024 )]
    string ManagedElementTypeDescription;
};
```

Below is an example of an output DDL statement that is generated by the translation engine of the translator. This statement describes a CREATE statement for a table that corresponds to the MOF specification of the class.

```
CREATE TABLE IBM.MgdElTp (ObjectId INTEGER NOT NULL
GENERATED BY
DEFAULT AS IDENTITY (START WITH 100000, INCREMENT BY
1, CACHE 20),
    MgdElTpCaption          VARCHAR(64) NOT NULL,
    MgdElTpAcronym          VARCHAR(10),
    MgdElTpDsc              VARCHAR(1024)
) IN CIMD0001 INDEX IN CIMI0001;
ALTER TABLE IBM.MgdElTp ADD CONSTRAINT MgdElTp_PK
PRIMARY KEY (ObjectId)
;
ALTER TABLE IBM.MgdElTp ADD CONSTRAINT MgdElTp_U0
UNIQUE
(MgdElTpCaption) ;
```

Below is an example of an XML-based Object-to-Relational (O/R) mapping file that is generated by the Translation engine. This file defines mappings between Java classes and database tables.

```
    </class>
    <class name="com.ibm.cim.bean.IBM_ManagedElementTypeBean"
        identity="ObjectId" key-
generator="MAX">
        <description>IBM_ManagedElementType</description>
        <map-to table="IBM.MgdElTp" />
        <field name="ObjectId" type="integer" >
            <sql name="ObjectId" type="integer"/>
        </field>
        <field name="ManagedElementTypeCaption" type="string">
            <sql name="MgdElTpCaption" type="char" />
        </field>
        <field name="ManagedElementTypeAcronym" type="string">
            <sql name="MgdElTpAcronym" type="char" />
        </field>
        <field name="ManagedElementTypeDescription" type="string">
            <sql name="MgdElTpDsc" type="char" />
        </field>
```

Below is an example of a Java class that is generated by the Translation engine. This represents the MOF specification of the class. The Java class attributes correspond to the MOF specification as well. The class also contains accessor methods for these attributes.

```
/**
 * This file was auto-generated.
 */
package com.ibm.cim.bean;
import javax.wbem.client.*;
import javax.wbem.cim.*;
import java.util.*;
import java.lang.Exception;
/**
 * This Class contains accessor and mutator methods for all properties defined in the CIM class
 * IBM_ManagedElementType as well as methods comparable to the invokeMethods defined for this
 * class. This Class implements the IBM_ManagedElementTypeBean Interface. The CIM class
 * IBM_ManagedElementType is described as follows:
 *
 * This is the IBM extention and stores information about ManagedElementType.
 */
public class IBM_ManagedElementTypeBean extends CIMBean {
    private final static String[ ] keysArr = {
"ManagedElementTypeCaption"};
    private final String versionStr = "2.7.0";
    public static final String cimClassName = "IBM_ManagedElementType";
    public IBM_ManagedElementTypeBean( ) {
        super( );
        init(cimClassName);
    } // constructor
    /**
     * This method returns the Version qualifier value of CIM class IBM_ManagedElementType
or "-1" if the class does not have a Version qualifier.
     *
     * @return     String Version qualifier value or "-1" if there isn't one
     */
    public String getBeanVersion( ) {
        return versionStr;
    } // getBeanVersion
    /**
     * This method returns an array of Strings with the names of the key qualified properties
     * defined for the CIM class. This method is used to build the CIMObjectPath of the
     * CIMInstance managed by the Bean in the case that the key qualifiers are not included
     * in the CIMInstance.
     *
     * @return     String[ ]      array of the key qualified property names
     */
    public String[ ] getBeanKeys( ) {
    return keysArr;
    } // getBeanKeys
    /**
     * This method returns the IBM_ManagedElementType.ManagedElementTypeAcronym
property
     * value. This property is described as follows:
     *
     * The ManagedElement Type Acronym.
     *
     * @return     String current ManagedElementTypeAcronym property value
     * @exception  Exception
     */
    public String getManagedElementTypeAcronym( ) throws Exception {
        if (getProperty("ManagedElementTypeAcronym") != null) {
            return (String)getProperty("ManagedElementTypeAcronym");
        } else {
            return null;
        }
    } // getManagedElementTypeAcronym
    /**
     * This method sets the IBM_ManagedElementType.ManagedElementTypeAcronym property
value.
     * This property is described as follows:
     *
     * The ManagedElement Type Acronym.
     *
     * @param      String new ManagedElementTypeAcronym property value
     * @exception  Exception
     */
    public void setManagedElementTypeAcronym(String managedElementTypeAcronym) throws
        Exception {
        if (managedElementTypeAcronym != null) {
            setProperty("ManagedElementTypeAcronym",
managedElementTypeAcronym);
        }
    } // setManagedElementTypeAcronym
    /**
```

```
    * This method returns the IBM_ManagedElementType.ManagedElementTypeCaption
property
    * value. This property is described as follows:
    *
    * The ManagedElement Type Caption.
    *
    * @return      String current ManagedElementTypeCaption property value
    * @exception   Exception
    */
    public String getManagedElementTypeCaption( ) throws Exception {
        if (getProperty("ManagedElementTypeCaption") != null) {
            return (String)getProperty("ManagedElementTypeCaption");
        } else {
            return null;
        }
    } // getManagedElementTypeCaption
    /**
    * This method sets the IBM_ManagedElementType.ManagedElementTypeCaption property
value.
    * This property is described as follows:
    *
    * The ManagedElement Type Caption.
    *
    * @param       String new ManagedElementTypeCaption property value
    * @exception   Exception
    */
    public void setManagedElementTypeCaption(String managedElementTypeCaption) throws
        Exception {
        if (managedElementTypeCaption != null) {
            setProperty("ManagedElementTypeCaption", managedElementTypeCaption);
        }
    } // setManagedElementTypeCaption
    /**
    * This method returns the IBM_ManagedElementType.ManagedElementTypeDescription
property
    * value. This property is described as follows:
    *
    * The ManagedElement Type Description.
    *
    * @return      String current ManagedElementTypeDescription property value
    * @exception   Exception
    */
    public String getManagedElementTypeDescription( ) throws Exception {
        if (getProperty("ManagedElementTypeDescription") != null) {
            return (String)getProperty("ManagedElementTypeDescription");
        } else {
            return null;
        }
    } // getManagedElementTypeDescription
    /**
    * This method sets the IBM_ManagedElementType.ManagedElementTypeDescription
property
    * value. This property is described as follows:
    *
    * The ManagedElement Type Description.
    *
    * @param       String new ManagedElementTypeDescription property value
    * @exception   Exception
    */
    public void setManagedElementTypeDescription(String managedElementTypeDescription)
throws
        Exception {
        if (managedElementTypeDescription != null) {
            setProperty("ManagedElementTypeDescription",
                managedElementTypeDescription);
        }
    } // setManagedElementTypeDescription
} // Class IBM_ManagedElementTypeBean
```

What is claimed is:

1. A method to transform a meta object facility file, comprising the steps of:
   a computer parsing the meta object facility file into a plurality of schema elements;
   for each schema element, the computer determining that a definition of a schema element is complete;
   for each schema element, the computer processing the schema element to create a computing artifact usable in at least one of: a database description language database table and a JAVA class;
   the computer determining a schema element is a meta object facility class;
   the computer creating a modeling entity that stores the computing artifacts derived from the meta object facility file; wherein the modeling entity is a JAVA class;
   the computer transforming the meta object facility class into a JAVA class;
   the computer determining that an attribute of the meta object facility class has an array of values;
   the computer creating an array table in the modeling entity;
   the computer identifying the array table in the modeling entity;
   the computer adding an array attribute to JAVABEAN information in the modeling entity.

2. The method of claim 1, wherein the modeling entity derived from the meta object facility file is a database description language database table and the step of processing the schema element further comprises:
   the computer transforming the meta object facility class into a database description language database table reflecting an object-oriented hierarchy of the plurality of schema elements of the meta object facility class; and
   the computer transforming attributes of the meta object facility class into columns of the database table.

3. The method of claim 1, further comprising the computer identifying those schema elements generated from meta object facility enumerated lists.

4. The method of claim 2, further comprising the steps of:
   the computer determining that the value of the attribute uniquely identifies an instance of the meta object facility class;
   the computer creating a unique key column in the modeling entity to indicate each instance of the meta object facility class.

5. The method of claim 2, further comprising the steps of:
   the computer determining that the attribute of the meta object facility class was previously defined;
   the computer propagating a value of the previously-defined attribute; and
   the computer constraining the previously-defined attribute.

6. The method of claim 1, further comprising the steps of:
   the computer determining that an attribute of the meta object facility class associates a plurality of previously-defined meta object facility classes;
   the computer creating an association indicator in the modeling entity referencing the previously-defined meta object facility classes.

7. The method of claim 6, further comprising the steps of:
   the computer creating a constraint in the modeling entity to reference the previously-defined meta object facility class.

8. The method of claim 1, further comprising the steps of
   the computer creating a plurality of JAVA attributes, each of which reference a previously defined meta object facility class;
   the computer adding information pertaining to each of the plurality of JAVA attributes to JAVABEAN information in the modeling entity.

9. The method of claim 1, further comprising that steps of:
   the computer determining that the meta object facility class that associates a plurality of previously-defined meta object facility classes has an override qualifier; and
   the computer relying on the previously-defined meta object facility classes for the attribute;
   the computer adding an association attribute to JAVABEAN information in the modeling entity.

10. The method of claim 1, further comprising the steps of:
    the computer determining that the array of values are derived from a simple list of values;
    the computer creating a list enumeration table having the simple list of values;
    the computer referencing the list enumeration table in the modeling entity;
    the computer adding an enumeration attribute to JAVABEAN information in the modeling entity.

11. The method of claim 1, further comprising the steps of:
    the computer determining that the array of values are derived from an indexed list of values;
    the computer representing the values of the array in the modeling entity as being dependent upon a position in the indexed list of values;
    the computer creating an indexed enumeration table having a plurality of positions and a value corresponding to the position;
    the computer referencing the indexed enumeration table in the modeling entity;
    the computer adding an enumeration attribute to JAVABEAN information in the modeling entity.

12. The method of claim 1, further comprising the steps of:
    the computer determining that the array of values are derived from a mapped list of values;
    the computer creating a mapped enumeration table in the modeling entity having a plurality of positions and a value corresponding to the position;
    the computer referencing the mapped enumeration table in the modeling entity;
    the computer adding an enumeration attribute to JAVABEAN information in the modeling entity.

13. A computer program product in a computer-readable tangible storage device, comprising a database description language database schema created by the process of claim 1, said database description language database schema comprising tables, columns, and references reflecting the object oriented hierarchy of objects specified in the meta object facility file.

14. A computer program product in a computer-readable tangible storage device, comprising at least one JAVA class created by the process of claim 1, said JAVA class having JAVABEAN information reflecting the object-oriented hierarchy of objects specified in an meta object facility file.

15. A computer program product in a computer-readable tangible storage device, comprising at least one of the following created by the process of claim 1:
    a database description language database schema having at least one table and one column that accurately reflects the object-oriented hierarchy of at least one object described in a meta object facility file;
    at least one JAVA class having at least one attribute corresponding to the objects described in the meta object facility file;
    an object-to-relational (O/R) mapping file that maps the at least one JAVA class and its at least one attribute to the at least one table and one column in the database description language database schema;
a plurality of structure query language (SQL) insert statements that load values of the at least one object described in the meta object facility file;
database design reports; or
object-to-relational name translation reference reports.

16. A data communication system including a transmitting data processing device which transmits data on a communication network and a receiving data processing device which receives the data transmitted from the transmitting data processing device, said transmitting data processing device comprising: a transmitting portion which transmits a meta object facility data file, and said receiving data processing device comprising: a receiving portion which receives the meta object facility data file transmitted from the transmitting data processing device; and a processor that transforms the meta object facility data file into a database description language database and JAVA classes for use on the data communication system, the processor parsing the meta object facility file into a plurality of schema elements;
for each schema element, the processor determining that a definition of a schema element is complete;
for each schema element, the processor processing the schema element to create a computing artifact usable in at least one of: a database description language database table and a JAVA class;
the processor determining a schema element is a meta object facility class;
the processor creating a modeling entity that stores the computing artifacts;
the processor transforming the meta object facility class into a JAVA class;
the processor determining that an attribute of the meta object facility class has an array of values;
the processor creating an array table in the modeling entity;
the processor identifying the array table in the modeling entity;
the processor adding an array attribute to JAVABEAN information in the modeling entity.

17. The data communication system of claim 16, further comprising:
the processor determining that the array of values are derived from a simple list of values;
the processor creating a list enumeration table having the simple list of values;
the processor referencing the list enumeration table in the modeling entity;
the processor adding an enumeration attribute to JAVABEAN information in the modeling entity.

18. A computer program product to transform meta object facility files into computing artifacts usable in a database description language database and as JAVA classes, the computer program product comprising:
a computer readable tangible storage device;
first program instructions to download a file in meta object facility format across a network;
second program instruction to parse the meta object facility file into a plurality of meta object facility schema elements;
third program instruction to create a plurality of meta object facility classes from at least one of the plurality of meta object facility schema elements that accurately reflect the object oriented hierarchy of the meta object facility file;
fourth program instructions to determine if each of the plurality of meta object facility classes has attributes;
fifth program instructions to transform each of the plurality of meta object facility classes and its attributes into a database schema element, the database schema element being a table, having references to each attribute; and
sixth program instructions to create JAVABEAN information of the database schema element and its respective attributes for use in at least one JAVA class;
seventh program instructions to determine that an attribute of at least one of the meta object facility classes has an array of values;
eighth program instructions to create an array table in the modeling entity;
ninth program instructions to identify the array table in the modeling entity;
tenth program instructions to add an array attribute to JAVABEAN information in the modeling entity;
wherein said first, second, third, fourth, fifth, and sixth, seventh, eighth, ninth, and tenth program instructions are stored in the computer readable tangible storage device.

19. The computer program product of claim 18, comprising:
eleventh program instructions to create an object-to-relational (O/R) mapping file that maps the at least one JAVA class to the table and the referenced attributes of the database schema,
wherein the eleventh program instructions are stored in the computer readable tangible storage device.

20. The computer program product of claim 18:
twelfth program instructions to create and execute a plurality of structure query language (SQL) insert statements to load a plurality of values of meta object facility class having an enumeration attribute into the respective table of the database schema,
wherein the twelfth program instructions are stored on the computer readable tangible storage device.

21. The computer program product of claim 18, comprising:
thirteenth program instructions to create a database design report having a plurality of tables and attributes, and metadata pertaining to the database schema; and
fourteenth program instructions to map the attributes to the plurality of meta object facility schema elements,
wherein the thirteenth and fourteenth program instructions are stored on the computer readable tangible storage device.

22. The computer program product of claim 18, comprising:
fifteenth program instructions to create and execute a database description language file comprising the database schema elements, a listing of a plurality of schema elements, the attributes and values to populate each respective schema element, a plurality of import and export statements and SQL grant authorization statements to populate each respective schema element with the attributes and the values,
wherein the fifteenth program instructions are stored on the computer readable tangible storage device.

23. A computer readable tangible storage device having computer usable program code, wherein the computer usable program code, when loaded into the internal memory of a processing device, causes the processing device to create and execute JAVABEAN information of the database description language file of claim 22.

24. The computer program product of claim 18, comprising:

sixteenth program instructions to determine that the array of values are derived from a simple list of values;

seventeenth program instruction to create a list enumeration table having the simple list of values;

eighteenth program instructions to reference the list enumeration table in the modeling entity;

nineteenth program instructions to add an enumeration attribute to JAVABEAN information in the modeling entity;

wherein the sixteenth, seventeenth, eighteenth, and nineteenths program instructions are stored in the computer readable tangible storage device.

25. A service for managing data transfer transactions between at least one microprocessor device and a servlet, both coupled to a communication network, the at least one microprocessor device having processing hardware and/or software, the service comprising:

transferring a meta object facility formatted file to the at least one microprocessor device;

the microprocessor device parsing the meta object facility formatted file into at least one class having at least one attribute;

the microprocessor device creating at least one database schema element pertaining to each of the at least one class, the database schema element capable of storing the at least one attribute and at least one value of the attribute;

the microprocessor device creating JAVABEAN information pertaining to the created at least one database schema element;

the microprocessor device determining a schema element is a meta object facility class;

the microprocessor device creating a modeling entity that stores the computing artifacts;

the microprocessor device transforming the meta object facility class into a JAVA class;

the microprocessor device determining that the at least one attribute of the meta object facility class has an array of values;

the microprocessor device creating an array table in the modeling entity;

the microprocessor device identifying the array table in the modeling entity;

the microprocessor device adding an array attribute to JAVABEAN information in the modeling entity;

the microprocessor device storing the at least one schema element and the JAVA class in a computer readable tangible storage device;

storing the JAVABEAN information in a computer readable tangible storage device.

26. The service of claim 25, further comprising:

the microprocessor device determining that the array of values are derived from a simple list of values;

the microprocessor device creating a list enumeration table having the simple list of values;

the microprocessor device referencing the list enumeration table in the modeling entity;

the microprocessor device adding an enumeration attribute to JAVABEAN information in the modeling entity.

\* \* \* \* \*